Jan. 9, 1923.  
E. H. JONES.  
ELECTRODE AND WELDING AND LIKE ROD USED IN SOLDERING AND DEPOSITING METALS.  
FILED FEB. 18, 1920.

1,441,688.

INVENTOR:  
Ernest Henry Jones  
By Wm Wallace White  
ATTY.

Patented Jan. 9, 1923.

1,441,688

UNITED STATES PATENT OFFICE.

ERNEST HENRY JONES, OF LONDON, ENGLAND.

ELECTRODE AND WELDING AND LIKE ROD USED IN SOLDERING AND DEPOSITING METALS.

Application filed February 18, 1920. Serial No. 359,660.

*To all whom it may concern:*

Be it known that I, ERNEST HENRY JONES, a subject of the King of Great Britain, residing at 18 and 20 Church Street, Islington, London, England, have invented new and useful Improvements in Electrodes and Welding and like Rods Used in Soldering and Depositing Metals, of which the following is a specification.

This invention relates to electrodes and welding and like rods used for soldering and depositing metals by the electric arc or blow-pipe.

In depositing metals the electrode or rod (hereinafter referred to as electrode) is preferably formed of a metal or metals or alloy which when fused has similar characteristics to that upon which the deposit is to be made. In some cases difficulty is experienced in producing a metal electrode containing the requisite constituents suited to the work which under the electric arc or blow-pipe will yield efficient results; this is particularly the case with certain grades of iron and steel.

This invention has for its object improvements whereby this difficulty may be overcome, the invention being based upon the principle of building up the electrode from rods, wires, tubes, channels, and the like of suitable metals which when fused under the influence of the electric arc or blow-pipe become alloyed.

According to this invention, instead of employing metal in the form of tubes, channels and the like to enclose the other metal or metals or alloys, the metals or alloy to form the electrode are arranged parallel to one another and (or) of uniform proportion throughout their length and are united to each other to form a welding or like rod having the desired metallic characteristics when fused, the said rod being formed into an electrode by covering it with asbestos or other second class conductor.

The accompanying drawings illustrate several constructions according to the invention by way of example.

Figure 1:
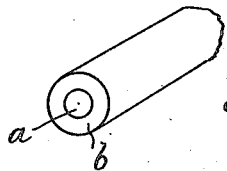
Figs. 1, 2, 3, 4 and 5 illustrate various methods by which two or more metals or alloys may be united to form a rod by casting one metal in or about another metal or metals.
Figure 2:
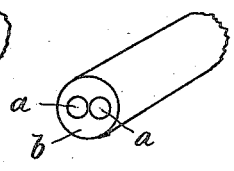
Figure 3:
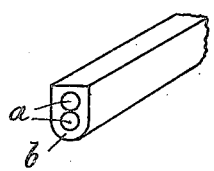
Figure 4:
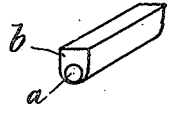
Figure 5:
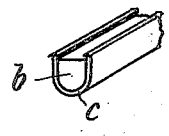
Figure 6:
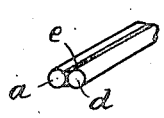
Fig. 6 illustrates two metals or alloys brazed, soldered, or autogenously welded together.

Referring to Figs. 1 to 4, $a$ represents a wire or wires and $b$ represents metal or alloy united to said wire or wires by casting or analogous process. In Fig. 5, the metal or alloy $b$ is cast in a channel section casing $c$ of suitable metal or alloy. Fig. 6 represents two metals or alloys $a$ and $d$ united by a brazing, soldering, or autogenous welding process, the joint being indicated at $e$.

The casting method illustrated by Figs. 1 to 5 is particularly useful where a definite proportion of carbon is required in the deposited metal, it being possible to calculate and provide the proportion of mild steel $(a)$ to cast iron $(b)$ in order to dilute the carbon in the cast iron.

In all cases where desirable a small proportion of metal such as nickel may be added to the wire or wires by an electroplating process. When a number of wires are united by binding, twisting, or plaiting the same together (or by binding, twisting or plaiting some of them about one or more of the wires) the metals of said wires are chosen so that when fused under the flame of the blow pipe or electric arc they enter into the composition of the alloy having the desired metallic characteristics.

I claim:—

A composite welding rod formed of a plurality of rods of different materials in the same proportions as the constituents of the material to be welded, said rods being fusible at different temperatures and secured together by casting the metal of lowest melting point about the other rods.

In testimony whereof I have signed my name to this specification.

ERNEST HENRY JONES.